United States Patent
Milio et al.

(10) Patent No.: US 9,045,001 B2
(45) Date of Patent: Jun. 2, 2015

(54) AXLE SHAFT ASSEMBLY

(75) Inventors: Raymond A. Milio, Troy, MI (US);
Hugh David Pritchard, Sterling Heights, MI (US); Antonio Coletta, Windsor (CA); Licinio Curti, Windsor (CA); Kenneth Kinfun Yu, Clarkston, MI (US); Harry William Trost, Rochester Hills, MI (US); Michael Vedder, Grand Blanc, MI (US); Daniel James Crabtree, Farmington, MI (US); Jack R. McKenzie, Clarkston, MI (US); David Gonska, Beverly Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1312 days.

(21) Appl. No.: 12/411,662

(22) Filed: Mar. 26, 2009

(65) Prior Publication Data

US 2010/0244546 A1    Sep. 30, 2010

(51) Int. Cl.
*B60B 37/04* (2006.01)

(52) U.S. Cl.
CPC ........... *B60B 37/04* (2013.01); *Y10T 29/49826* (2015.01)

(58) Field of Classification Search
USPC ............ 301/124.1, 125, 126, 111.01, 111.04; 29/428, 525.14; 464/179; 295/36.1
See application file for complete search history.

(56) References Cited

U.S. PATENT DOCUMENTS

| | | | | |
|---|---|---|---|---|
| 3,631,585 | A * | 1/1972 | Stamm | 228/114.5 |
| 4,087,038 | A * | 5/1978 | Yagi | 228/114.5 |
| 4,135,766 | A * | 1/1979 | Trautloff | 301/114 |
| 4,351,407 | A * | 9/1982 | Call | 180/385 |
| 4,659,005 | A * | 4/1987 | Spindler | 228/114.5 |
| 4,768,839 | A * | 9/1988 | Spindler | 301/124.1 |
| 5,205,464 | A * | 4/1993 | Simon | 228/114 |
| 6,059,378 | A * | 5/2000 | Dougherty et al. | 301/124.1 |
| 6,065,813 | A * | 5/2000 | Fett et al. | 301/124.1 |
| 6,572,199 | B1 * | 6/2003 | Creek et al. | 301/124.1 |
| 6,698,078 | B2 * | 3/2004 | Prucher | 29/428 |
| 7,229,137 | B2 * | 6/2007 | Roberts et al. | 301/124.1 |
| 2002/0197104 | A1 * | 12/2002 | Bauman et al. | 403/274 |

* cited by examiner

*Primary Examiner* — Kip T Kotter
(74) *Attorney, Agent, or Firm* — Brooks Kushman P.C.

(57) ABSTRACT

An axle shaft is fabricated from two separate pieces. The axle shaft is comprised of an axle shaft body having a forged initial flange portion formed at one end. An axle shaft flange, fabricated by stamping or casting for example, is secured to the forged initial flange portion at a weld interface to form a finished axle shaft.

22 Claims, 1 Drawing Sheet

AXLE SHAFT ASSEMBLY

TECHNICAL FIELD

This invention generally relates to a two-piece axle shaft and a method of fabricating a two-piece axle shaft.

BACKGROUND OF THE INVENTION

Drive axles include a pair of axle shafts that are used to drive opposing laterally spaced wheels. Traditionally, axle shafts are fabricated from a single piece of round bar stock. The round bar stock is subjected to a forging operation that produces an axle shaft having a shaft body that transitions into a large axle shaft flange at one end. This forged axle shaft flange is to be coupled to a rotatable wheel component.

The forged axle shaft flange is defined by a large diameter, which presents many manufacturing challenges. This also results in significantly high procurement costs. Thus, there is a need for an axle shaft assembly that can be easily fabricated to overcome the challenges discussed above.

SUMMARY OF THE INVENTION

An axle shaft is fabricated from two separate pieces including an axle shaft body and an axle shaft flange. The axle shaft body has a forged initial flange portion formed at one end and the axle shaft flange is secured to the forged initial flange portion at a weld interface to form a finished axle shaft.

In one example, the axle shaft flange is formed by stamping or casting. The axle shaft flange comprises a disc-shaped body having a center opening that receives the axle shaft body. A radial gap is located between an outer surface of the axle shaft body and an inner surface of the center opening.

In one example, the weld interface is located directly between an inboard facing surface of the forged initial flange portion and an outboard facing surface of the axle shaft flange.

These and other features of the present invention can be best understood from the following specification and drawings, the following of which is a brief description.

DETAILED DESCRIPTION OF THE PREFERRED EMBODIMENT

Figure 1:
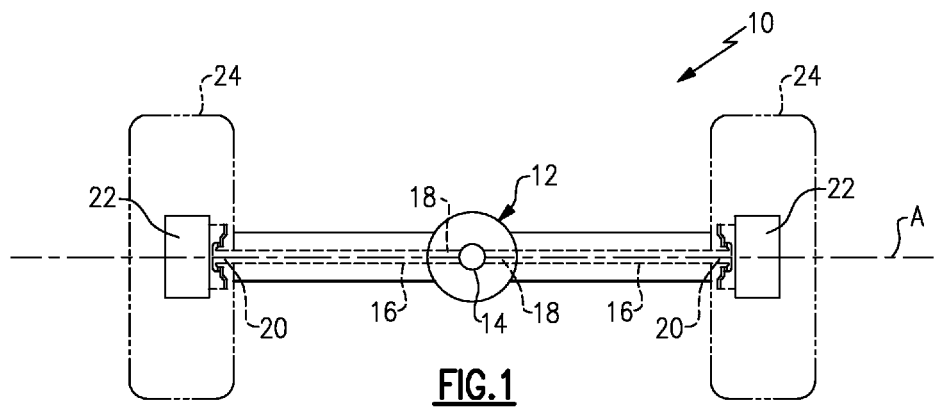
FIG. 1 is a schematic view of a drive axle.

FIG. 1 shows a drive axle assembly 10 that includes a carrier 12 with a differential gear assembly 14 coupled to drive a pair of axle shafts 16. Each axle shaft 16 has an inboard end 18 and an outboard end 20. The term "inboard" is used to refer to a direction that faces inwardly toward a vehicle center and the term "outboard" is used to refer to a direction that faces outwardly away from a vehicle center. The inboard ends 18 are driven by the differential gear assembly 14 and the outboard ends 20 are coupled to a rotatable wheel component 22. The rotatable wheel components 22 support tires 24 for rotation about a wheel axis A.

Figure 2:
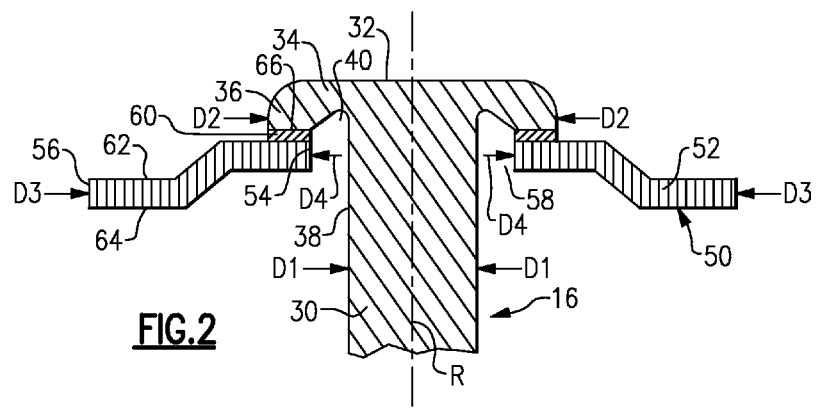
FIG. 2 is a cross-sectional view of an axle shaft as used in the drive axle of FIG. 1.

The axle shaft 16 is shown in greater detail in FIG. 2. The axle shaft 16 is fabricated from two different components by a method that will be discussed in greater detail below. Each axle shaft 16 is substantially the same. Further, the drive axle assembly 10 of FIG. 1 is merely one example of an axle that utilizes the subject axle shafts 16; it should be understood that the axle shafts 16 could also be used in other types of axles.

As shown in FIG. 2, each axle shaft 16 has an elongated axle shaft body 30 that is defined by a first diameter D1. The axle shaft body 30 defines a central axis of rotation R about which the axle shaft 16 rotates. The axle shaft body 30 is formed from a raw material or could be forged from round bar stock. The axle shaft body 30 transitions into an initial axle flange portion 32 that is defined by a second diameter D2 at an outer edge of the initial axle flange portion 32 that is greater than the first diameter D1. In one example, the axle shaft body 30 is left in a raw material state and the initial flange portion 32 is forged. This initial axle flange portion 32 does not provide a mount interlace to the rotatable wheel component 22, and is significantly smaller in diameter than the traditional forged axle flange.

The initial flange portion 32 is comprised of a radial portion 34 that extends radially outward relative to the axis of rotation R to the outer edge at D2 and an axial portion 36 that extends axially inboard from the outer edge at D2 in a direction that is generally common to a direction defined by the axis of rotation R. In one example, the axial portion 36 is parallel to the axis of rotation R and the radial portion 34 defines an end face of the axle shaft 16 that extends generally perpendicular to the axis of rotation R.

The axial portion 36 is spaced radially outward relative to an outer surface 38 of the axle shaft body 30. This forms a radial gap 40 between the axial portion 36 and the axle shaft body 30.

In addition to the forged component, i.e. initial flange portion 32, each axle shaft 16 includes a second component that comprises an axle shaft flange 50. The axle shaft flange 50 can be fabricated by any one of many different processes including stamping, for example.

The axle shaft flange 50 comprises a disc-shaped body 52 that has a center opening 54 and an outer peripheral edge 56. The outer peripheral edge 56 is defined by a third diameter D3 that is greater than the second diameter D2. The center opening 54 is defined by a fourth diameter D4 at an innermost peripheral edge which is greater than the first diameter D1 but less than the second diameter D2. This forms a gap 58 between the inner surface of the center opening 54 and the outer surface 38 of the axle shaft body 30 such that the innermost peripheral edge at D4 does not contact the axle shaft body 30.

The axle shaft flange 50 is welded to the initial flange portion 32 at a weld interface 60 to form a finished axle shaft 16. Once attached, the axle shaft flange 50 provides the mount interface for attachment to the rotatable wheel components 22.

The axle shaft flange 50 includes an outboard facing surface 62 and an inboard facing surface 64. The weld interface 60 is located immediately adjacent the center opening 54 between the outboard facing surface 62 of the axle shaft flange 50 and an inboard facing surface 66 of the axial portion 36 of the initial flange portion 32.

Any type of welding process can be used to form the weld interface 60. In one example, the weld process is a hybrid process of friction and flash butt welding utilizing induction heating and friction welding. This type of welding process has been used by Spinduction.

Figure 3:
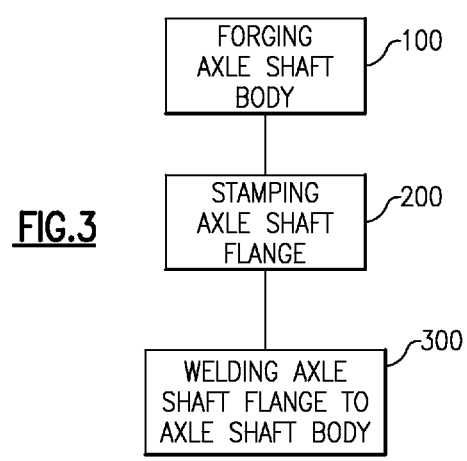
FIG. 3 is a chart depicting the method steps used to fabricate a two-piece axle shaft.

FIG. 3 provides a schematic overview of the steps for fabricating the axle shaft 16. First, as indicated at 100, the axle shaft body 30 is formed from a raw material with the initial flange portion 32 at one end being forged. Next, as indicated at 200, an axle shaft flange 50 is formed by stamping, for example. Finally, as indicated at 300, the axle shaft flange 50 is welded onto the initial flange portion 32 of the axle shaft body 30 at a weld interface 60 to form a finished axle shaft 16.

The provision of a two-piece axle shaft comprised of a shaft body with a forged initial flange portion and a separately attached axle shaft flange avoids manufacturing challenges presented by forming large forged flange diameters. This also greatly increases sourcing flexibility and reduces procurement costs.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An axle shaft assembly comprising:
   an axle shaft body defining an axis of rotation and having a forged initial flange portion at one end;
   an axle shaft flange having a center opening defining an innermost peripheral edge that is radially spaced away from said axis of rotation to provide a radial gap between said innermost peripheral edge and said axle shaft body; and
   a weld interface between the axle shaft flange and the forged initial flange portion.

2. The axle shaft assembly according to claim 1 wherein said axle shaft flange comprises one of a stamped component or a cast component.

3. The axle shaft assembly according to claim 1 wherein said weld interface is directly between an inboard facing surface of said forged initial flange portion and an outboard facing surface of said axle shaft flange.

4. The axle shaft assembly according to claim 1 wherein said axle shaft body comprises a solid body structure.

5. The axle shaft assembly according to claim 1 wherein said axle shaft body is defined by a first diameter, said forged initial flange portion is defined by a second diameter, and said axle shaft flange is defined by a third diameter, said second diameter being greater than said first diameter, and said third diameter being greater than said second diameter.

6. The axle shaft assembly according to claim 1 wherein said forged initial flange portion comprises a radial portion that extends radially outward relative to said central axis of rotation and an axial portion that extends axially inboard.

7. The axle shaft assembly according to claim 6 wherein said radial gap comprises a first radial gap and including a second radial gap that is formed between said axial portion and an outer surface of said axle shaft body.

8. The axle shaft assembly according to claim 6 wherein said weld interface is between said axial portion and said axle shaft flange.

9. The axle shaft assembly according to claim 1 wherein an entirety of said innermost peripheral edge is spaced apart from an outer surface of said axle shaft body by said radial gap such that there is an open area between the outer surface of the axle shaft body and the innermost peripheral edge of the center opening along the entirety of the innermost peripheral edge.

10. The axle shaft assembly according to claim 1 wherein said axle shaft body extends between an inboard end and an outboard end and wherein said outboard end terminates at said initial flange portion which comprises a radial portion that extends radially outward relative to said axis of rotation and an axial portion that extends axially inboard at an outer periphery of said radial portion.

11. The axle shaft assembly according to claim 1 wherein said initial flange portion is comprised of a radial portion that extends radially outward relative to the axis of rotation to an outer edge and an axial portion that extends from said outer edge in an axially inboard direction, and wherein said axial portion is spaced radially outward relative to an outer surface of said axle shaft body to form a further radial gap between the axial portion and the axle shaft body.

12. An axle shaft assembly comprising:
   an axle shaft body defined by a first diameter and having a forged initial flange portion defined by a second diameter at one end, and wherein said axle shaft body defines a central axis of rotation, and wherein said forged initial flange portion comprises a radial portion that extends radially outward relative to said central axis of rotation and an axial portion that extends axially inboard;
   an axle shaft flange defined by a third diameter, said second diameter being greater than said first diameter, and said third diameter being greater than said second diameter, and wherein said axle shaft flange comprises a disc-shaped body having a center opening defined by a fourth diameter that is greater than said first diameter and less than said second diameter, and wherein said axle shaft body extends through said center opening such that there is a radial gap between an inner surface of said center opening and an outer surface of said axle shaft body; and
   a weld interface between an inboard facing surface of said axial portion and an outboard facing surface of said disc-shaped body immediately adjacent said center opening.

13. The axle shaft assembly according to claim 12 wherein said initial flange portion is comprised of a radial portion that extends radially outward relative to the central axis of rotation to an outer edge and an axial portion that extends from said outer edge in an axially inboard direction, and wherein said axial portion is spaced radially outward relative to an outer surface of said axle shaft body such that said radial gap further extends between the axial portion and the axle shaft body.

14. The axle shaft assembly according to claim 12 wherein said radial gap is formed along an entirety of said inner surface of said center opening such that there is an open area between the outer surface of the axle shaft body and the inner surface of the center opening along the entirety of the inner surface.

15. A method of fabricating an axle shaft comprising the steps of:
   (a) forging an initial flange portion at one end of an axle shaft;
   (b) producing an axle shaft flange having a center opening defining an inner peripheral edge;
   (c) positioning the axle shaft flange such that the inner peripheral edge of the axle flange does not contact the axle shaft; and
   (d) welding the axle shaft flange to the axle shaft.

16. The method according to claim 15 wherein step (a) further includes providing the axle shaft to have an elongated shaft body defined by a first diameter and a forged initial flange portion at one end of the elongated shaft body defined by a second diameter greater than the first diameter.

17. The method according to claim 16 wherein the elongated shaft body comprises a solid component.

18. The method according to claim 16 wherein step (b) further includes stamping or casting the axle shaft flange to form a final axle shaft flange portion that is defined by a third diameter greater than the second diameter.

19. The method according to claim 18 wherein step (d) includes welding an inboard facing surface of the forged initial flange portion to an outboard facing surface of the final axle shaft flange portion to form a finished axle shaft.

20. The method according to claim 15 wherein step (a) further includes forming the axle shaft to have an elongated shaft body defined by a first diameter with the initial flange portion being defined by a second diameter that is greater than the first diameter, and wherein step (b) includes forming the axle shaft flange to have an outer peripheral edge that defines a third diameter and with the inner peripheral edge defining a fourth diameter that is greater than the first diameter and less than the second diameter, and including spacing the inner peripheral edge away from an outer surface of the elongated shaft body to provide a radial air gap between the axle shaft flange and the axle shaft.

21. The method according to claim 15 including forming the axle shaft flange as a disc-shaped body with the inner peripheral edge comprising an innermost peripheral surface and with an entirety of the innermost peripheral surface being spaced apart from an outer surface of the axle shaft by a radial gap such that there is an open area between the outer surface of the axle shaft and the innermost peripheral surface of the center opening along the entirety of the innermost peripheral surface.

22. The method according to claim 15 including forming the initial flange portion to have a radial portion that extends radially outward relative to an axis of rotation to an outer edge and an axial portion that extends from the outer edge in an axially inboard direction, and including spacing the axial portion radially outward relative to an outer surface of the axle shaft to form a radial gap between the axial portion and the axle shaft and between the inner peripheral edge of the axle shaft flange and the axle shaft.

* * * * *